(12) United States Patent
Yang (10) Patent No.: US 7,778,051 B2
(45) Date of Patent: Aug. 17, 2010

(54) OUTPUT CURRENT CONTROL CIRCUIT FOR POWER CONVERTER WITH A CHANGEABLE SWITCHING FREQUENCY

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 471 days.

(21) Appl. No.: 11/685,786

(22) Filed: Mar. 14, 2007

(65) Prior Publication Data

US 2008/0232142 A1 Sep. 25, 2008

(51) Int. Cl.
*H02M 3/335* (2006.01)

(52) U.S. Cl. ............ 363/21.18; 363/21.16; 363/80

(58) Field of Classification Search .......... 363/21.18, 363/21.16, 80, 79, 21.15, 21.01

See application file for complete search history.

(56) References Cited

U.S. PATENT DOCUMENTS 6,853,563 B1 * 2/2005 Yang et al. ............. 363/21.15
6,977,824 B1   12/2005 Yang et al.
7,016,204 B2    3/2006 Yang et al.
7,061,780 B2    6/2006 Yang et al.
2006/0034102 A1 * 2/2006 Yang et al. ............. 363/21.13

* cited by examiner

*Primary Examiner*—Harry Behm
(74) *Attorney, Agent, or Firm*—Jianq Chyun IP Office (57) ABSTRACT

A control circuit controls the output current of the power converter at the primary side of the transformer. The control circuit includes a current-detection circuit for generating a primary-current signal in response to the switching current of the transformer. A voltage-detection circuit is coupled to the transformer to generate a period signal and a discharge-time signal in response to the reflected voltage of the transformer. A signal-process circuit is utilized to generate a current signal in response to the primary-current signal, the period signal and the discharge-time signal. The period signal is correlated to the switching period of the switching signal of the power converter. The discharge-time signal is correlated to the duty cycle of switching current at the secondary-side of the transformer. The current signal is correlated to the output current of the power converter.

10 Claims, 8 Drawing Sheets

OUTPUT CURRENT CONTROL CIRCUIT FOR POWER CONVERTER WITH A CHANGEABLE SWITCHING FREQUENCY

BACKGROUND OF THE INVENTION

1. Field of the Invention

The present invention relates to a power converter, and more particularly, to a control circuit of a power converter.

2. Description of Related Art

A variety of power converters have been widely used to provide a regulated voltage and current. In order to precisely control the output current, traditionally a current detection and control circuit is equipped at the output of the power converter. However, a considerable power loss is normally consumed due to the output current detection, particularly as the output current is high. Besides, this output current control circuit takes a space of the PCB (print circuit board) and increases the cost of the power converter. Thus it is desirable to provide a control circuit that combines with a switching control circuit of the power converter for the output current control. Furthermore, the control circuit can be combined with the switching control circuit as one integrated circuit, which dramatically reduced the space and cost of the power converter.

Many prior arts are developed to control the output current of the power converter, such as "Control circuit for controlling output current at primary side of a power converter" by Yang, et al., U.S. Pat. No. 6,977,824; "Close-loop PWM controller for primary-side controlled power converters" by Yang, et al., U.S. Pat. No. 7,016,204; "Switching control circuit with variable switching frequency for primary-side-controlled power converters" by Yang, et al., U.S. Pat. No. 7,061,780. The power converters of the foregoing prior arts operate at a predictable switching frequency, which facilitates the detection of the output current. However, these prior arts are unable to apply to power converters with changeable switching frequency such as resonant power converters.

SUMMARY OF THE INVENTION

The present invention provides a control circuit for a power converter to control an output current of the power converter with a changeable switching frequency. The control circuit includes a current-detection circuit coupled to a current sense device to generate a primary-current signal in response to a primary-side switching current of a transformer. A voltage-detection circuit is coupled to the transformer to generate a period signal and a discharge-time signal in response to a reflected voltage of the transformer. A signal-process circuit is used for generating a current signal in response to the primary-current signal, the period signal and the discharge-time signal. A switching control circuit is coupled to generate a switching signal in response to the current signal. The switching signal is utilized to switch the transformer and regulate the output current of the power converter. The period signal is correlated to the switching period of the switching signal. The discharge-time signal is correlated to the duty cycle of a secondary-side switching current of the transformer. Therefore, the current signal is correlated to the output current of the power converter.

DESCRIPTION OF THE PREFERRED EMBODIMENTS

Figure 1:
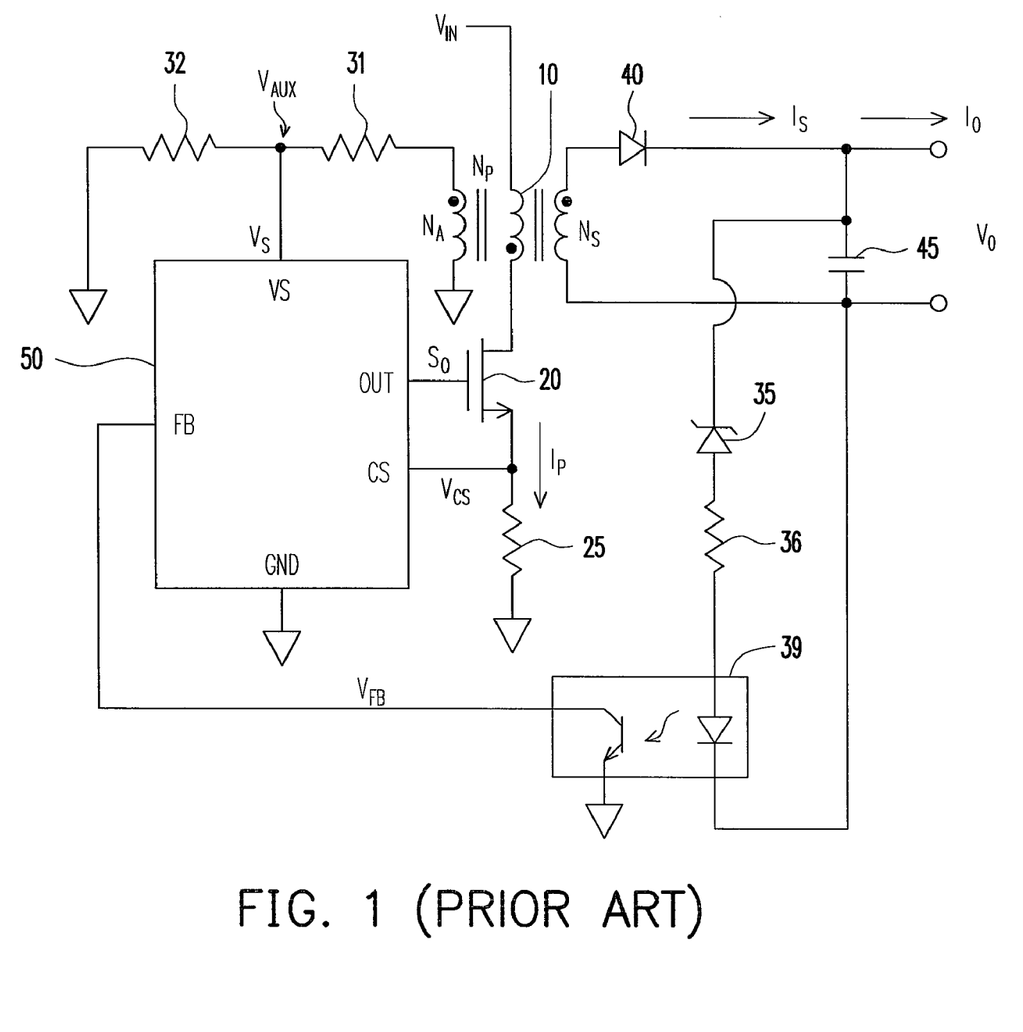
FIG. 1 illustrates a schematic diagram of a power converter.

FIG. 1 shows a power converter which includes a transformer 10 having an auxiliary winding $N_A$, a primary winding $N_P$, and a secondary winding $N_S$. In order to regulate an output voltage $V_O$ and an output current $I_O$ of the power converter, a control circuit 50 generates a switching signal $S_O$ to switch the transformer 10 through a transistor 20. A primary-side switching current $I_P$ is generated as the switching signal $S_O$ becomes high. A peak value $I_{PA}$ of the primary-side switching current $I_P$ is given by, $$I_{PA} = \frac{V_{IN}}{L_P} \times T_{ON} \qquad (1)$$

where $V_{IN}$ is an input voltage applied to the transformer 10, $L_P$ is the inductance of the primary winding $N_P$ of the transformer 10, $T_{ON}$ is an on-time of the switching signal $S_O$. Once the switching signal $S_O$ becomes to be low, the energy stored in the transformer 10 will be delivered to the output of the power converter via a rectifier 40 and the secondary-side of the transformer 10. A peak value $I_{SA}$ of a secondary-side switching current $I_S$ can be expressed by, $$I_{SA} = \frac{(V_O + V_F)}{L_S} \times T_D \qquad (2)$$

where $V_O$ is the output voltage of the power converter; $V_F$ is a forward voltage dropped across the rectifier 40; $L_S$ is the inductance of the secondary winding $N_S$ of the transformer 10; and $T_D$ is a discharging time of the secondary-side switching current $I_S$.

Meanwhile, a reflected voltage $V_{AUX}$ is generated at the auxiliary winding $N_A$ of the transformer 10. The reflected voltage $V_{AUX}$ is be given by, $$V_{AUX} = \frac{T_{NA}}{T_{NS}} \times (V_O + V_F) \qquad (3)$$

$$I_{SA} = \frac{T_{NP}}{T_{NS}} \times I_{PA} \qquad (4)$$

where $T_{NA}$, $T_{NP}$ and $T_{NS}$ are respectively the winding turns of the auxiliary winding $N_A$, the primary winding $N_P$ and the secondary winding $N_S$ of the transformer 10. As the secondary-side switching current $I_S$ falls to zero, the reflected voltage $V_{AUX}$ will start to decrease. This also indicates that the transformer 10 is fully demagnetized at this moment. Therefore, the discharging time $T_D$ in equation (2) can be measured from the falling edge of the switching signal $S_O$ to the falling point of the reflected voltage $V_{AUX}$. The power converter features that the energy of the transformer 10 is fully released before the next switching cycle starts.

Referring to FIG. 1, the control circuit 50 includes a voltage-detection terminal VS, a current-detection terminal CS, a feedback terminal FB, and an output terminal OUT. The output terminal OUT outputs the switching signal $S_O$. The voltage-detection terminal VS is coupled to the auxiliary winding $N_A$ via resistors 31 and 32 for detecting the reflected voltage $V_{AUX}$. The current-detection terminal CS is coupled to a current-sense device 25. The current-sense device 25 is connected from the transistor 20 to the ground for converting the primary-side switching current $I_P$ to a primary-side current signal $V_{CS}$. The feedback terminal FB is coupled to receive a voltage feedback signal $V_{FB}$ from the output $V_O$ of the power converter through an optical-coupler 39, a resistor 36 and a reference voltage device 35. Therefore, the control circuit 50 generates the switching signal $S_O$ to regulate the output voltage $V_O$ and control the output current $I_O$ in accordance with the feedback signal $V_{FB}$ and the primary-side current signal $V_{CS}$ respectively.

Figure 2:
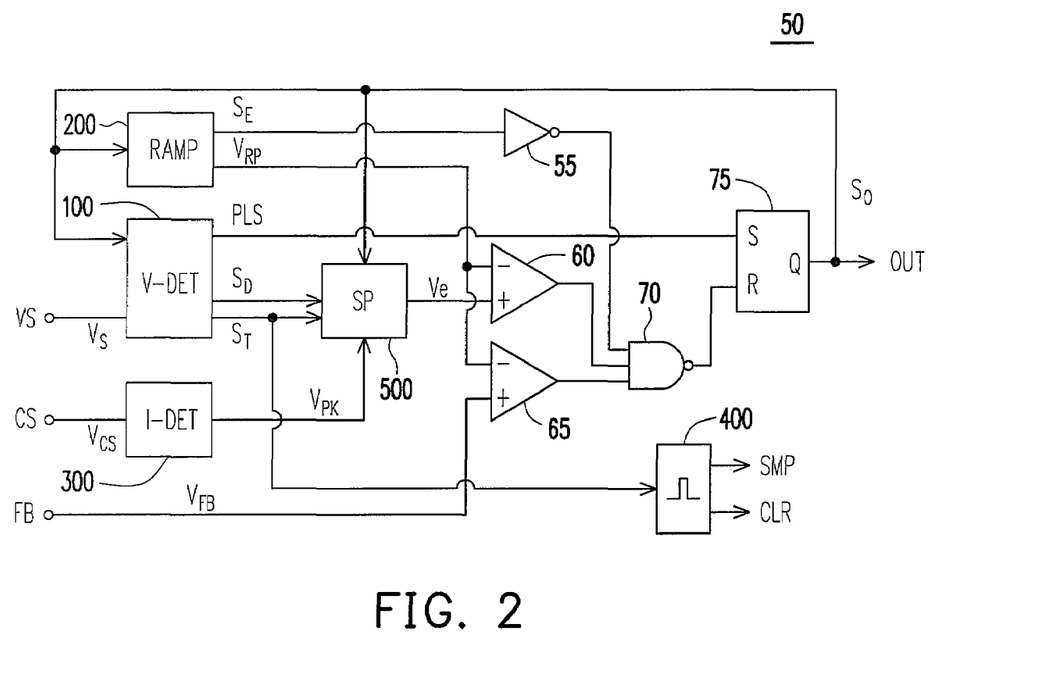
FIG. 2 illustrates a control circuit according to a preferred embodiment of the present invention.

FIG. 2 illustrates a preferred embodiment of the control circuit 50, as shown in FIG. 1. It includes a voltage-detection circuit (V-DET) 100 coupled to the transformer 10 through the voltage-detection terminal VS to generate a set signal PLS, a period signal $S_T$ and a discharge-time signal $S_D$ in response to the reflected voltage $V_{AUX}$ of the transformer 10. A ramp signal generator (RAMP) 200 is used to generate a ramp signal $V_{RP}$ and a maximum on-time signal $S_E$ in response to the switching signal $S_O$. A current-detection circuit (I-DET) 300 is coupled to the current sense device 25 through the current-detection terminal CS to generate a primary-current signal $V_{PK}$ in response to the primary-side switching current $I_P$ of the transformer 10. A signal-process circuit (SP) 500 is used for generating a current-error signal Ve in response to the primary-current signal $V_{PK}$, the period signal $S_T$ and the discharge-time signal $S_D$. A pulse generator 400 is coupled to the voltage-detection circuit (V-DET) 100 for receiving the period signal $S_T$ to generate a sample-pulse signal SMP and a clear-pulse signal CLR. An inverter 55, comparators 60, 65, an NAND gate 70 and a flip-flop 75 develop a switching control circuit. The set signal PLS is coupled to an input terminal (S) of the flip-flop 75 for enabling the flip-flop 75. The output of the flip-flop 75 generates the switching signal $S_O$. The negative input of comparator 60 and 65 are connected to the ramp signal $V_{RP}$. The positive input of the comparator 60 is connected to the current-error signal Ve. The positive input of the comparator 65 is connected to the feedback signal $V_{FB}$. The output of comparators 60 and 65 are connected to inputs of the NAND gate 70. Another input of the NAND gate 70 is coupled to the maximum on-time signal $S_E$ through the inverter 55. The output of the NAND gate 70 is connected to a reset terminal (R) of the flip-flop 75. Therefore, the switching control circuit generates the switching signal $S_O$ in response to the current-error signal Ve and the feedback signal $V_{FB}$ normally.

Figure 3:
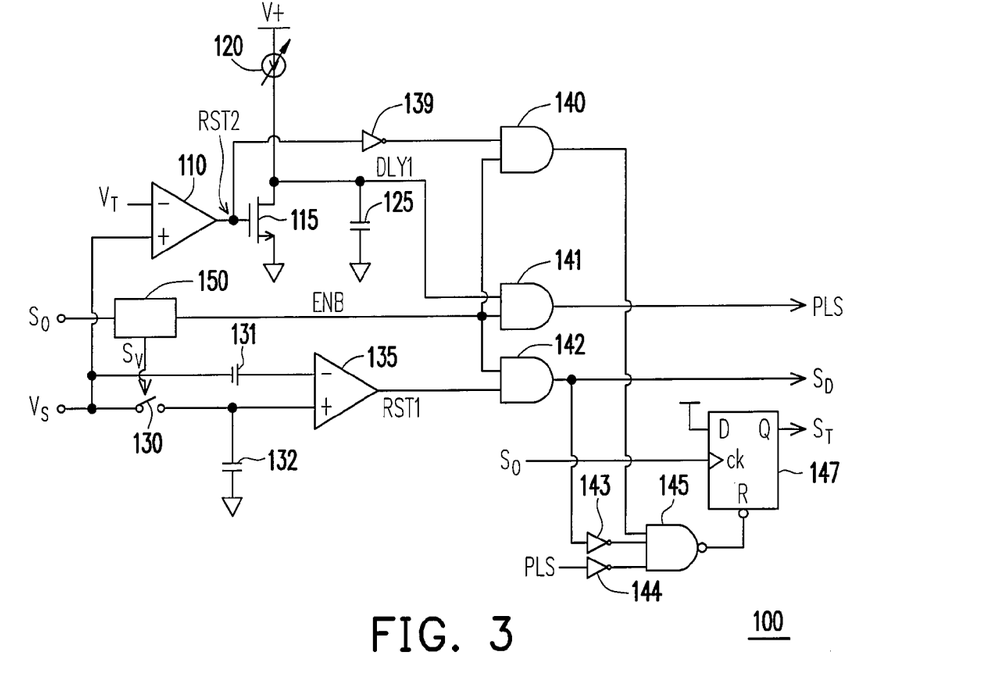
FIG. 3 illustrates a voltage-detection circuit according to a preferred embodiment of the present invention.

FIG. 3 illustrates a preferred embodiment of a voltage-detection circuit 100, as shown in FIG. 2. A switch 130 and a capacitor 132 develop a first sample circuit coupled to the transformer 10 through the voltage-detection terminal VS. The first sample circuit generates a voltage signal at the capacitor 132 by sampling the reflected voltage $V_{AUX}$ of the transformer 10 from the voltage-detection terminal VS. A comparator 135 and an offset voltage 131 form a first comparison circuit for generating a first reset signal RST1 in response to the reflected voltage $V_{AUX}$ of the transformer 10 and the voltage signal of the capacitor 132. A positive input of the comparator 135 is connected to the capacitor 132. A negative input of the comparator 135 is coupled to the voltage-detection terminal VS through the offset voltage 131. The voltage of the voltage-detection terminal VS and the voltage of the offset voltage 131 generate a level-shift signal. Therefore, the comparator 135 will generate the first reset signal RST1 once the level-shift signal is lower than the voltage signal of the capacitor 132.

A comparator 110 and a threshold voltage $V_T$ form a second comparison circuit for generating a second reset signal RST2 in response to the reflected voltage $V_{AUX}$ and the threshold voltage $V_T$. A positive input of the comparator 110 is connected to the voltage-detection terminal VS. A negative input of the comparator 110 is connected to the threshold voltage $V_T$. The second rest signal RST2 is generated once the voltage of the voltage-detection terminal VS is lower than the threshold voltage $V_T$. The switching signal $S_O$ is connected to a signal generation circuit 150 to generate a first sample signal $S_V$ and an enable signal ENB. The first sample signal $S_V$ controls the on/off of the switch 130. The disable of switching signal $S_O$ will generate the enable signal ENB that is connected to the input of AND gates 140, 141 and 142.

A transistor 115, a capacitor 125 and a programmable current source 120 develop a first time-delay circuit to generate a first time-delay signal DLY1 at the capacitor 125 in response to the enable of the second reset signal RST2. The first time-delay signal DLY1 is connected to another input of the AND gate 141. The output of the AND gate 141 generates the set signal PLS to initiate the next switching cycle of the switching signal $S_O$. The current of the programmable current source 120 is changed in accordance with the value of the reflected voltage of the transformer 10 in order to achieve the soft switching of the power converter such as resonant power converters and quasi-resonant power converters. The AND gate 142 is utilized to generate the discharge-time signal $S_D$. An input of the AND gate 142 is connected to the first reset signal RST1. Therefore, the discharge-time signal $S_D$ is enabled in response to disable of the switching signal $S_O$. The disable of the discharge-time signal $S_O$ is controlled by the first reset signal RST1.

A flip-flop 147 is used to generate the period signal $S_T$. The switching signal $S_O$ is connected to the clock input of the flip-flop 147 to start the period signal $S_T$. A reset input of the flip-flop 147 is connected to an NAND gate 145. A first input of the NAND gate 145 is connected to the discharge-time signal $S_D$ through an inverter 143. A second input of the NAND gate 145 is connected to the set signal PLS through an inverter 144. A third input of the NAND gate 145 is connected to the output of the AND gate 140. The second reset signal RST2 is connected to an input of the AND gate 140 through an inverter 139. The period signal $S_T$ is thus enabled in response to the enable of the switching signal $S_O$. The period signal $S_T$ is disabled in response to the second reset signal RST2. Therefore, the period of the period signal $S_T$ is correlated to the switching period of the switching signal $S_O$.

Figure 4:
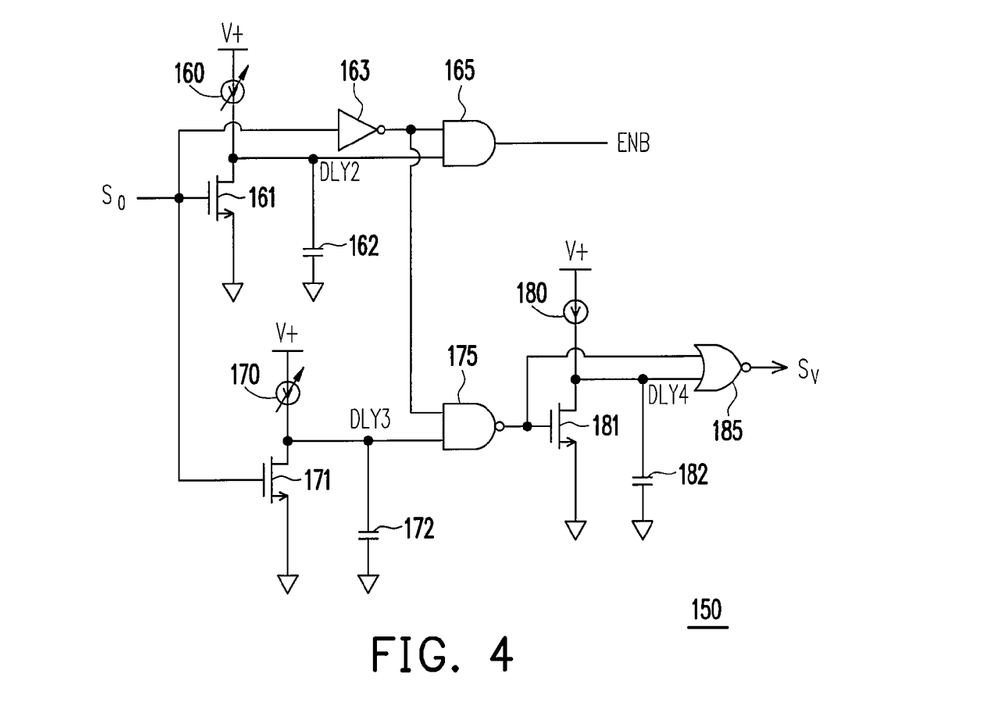
FIG. 4 shows a signal generation circuit.

FIG. 4 shows a preferred embodiment of a signal generation circuit 150, as shown in FIG. 3, that generates the first sample signal $S_V$ and the enable signal ENB. The signal generation circuit 150 includes a second time-delay circuit, a third time-delay circuit and a fourth time-delay circuit. A programmable current source 160, a transistor 161 and a capacitor 162 develop the second time-delay circuit to generate a second time-delay signal DLY2 at the capacitor 162. A programmable current source 170, a transistor 171 and a capacitor 172 form the third time-delay circuit to generate a third time-delay signal DLY3 at the capacitor 172. The switching signal $S_O$ is connected to the input of transistors 161 and 171. The second time-delay signal DLY2 and the third time-delay signal DLY3 are thus generated in response to the disable of the switching signal $S_O$. The second time-delay signal DLY2 is connected to an input of an AND gate 165. Another input of the AND gate 165 is connected to the switching signal $S_O$ through an inverter 163. An output of the AND gate 165 generate the enable signal ENB. The second time-delay circuit provides a blanking time for generating the enable signal ENB. The third time-delay circuit further provides a time delay to generate the third time-delay signal DLY3. The current of the programmable current source 170 is determined in response to the change of the pulse width of the switching signal $S_O$ in order to generate the first sample signal $S_V$ just before the fully demagnetizing of the transformer 10. The third time-delay signal DLY3 is connected to an input of an NAND gate 175. Another input of the NAND gate 175 is coupled to the switching signal $S_O$ through the inverter 163. An output of the NAND gate 175 is connected the input of the fourth time-delay circuit and an input of an NOR gate 185. A current source 180, a transistor 181 and a capacitor 182 develop the fourth time-delay circuit to generate a fourth time-delay signal DLY4 at the capacitor 182. The fourth time-delay circuit DLY4 is further connected to another input of the NOR gate 185. An output of the NOR gate 185 generates the first sample signal $S_V$ for sampling the reflected voltage $V_{AUX}$ of the transformer 10. The current of the current source 180 and the capacitance of the capacitor 182 determine the pulse width of the first sample signal $S_V$.

Figure 5A:
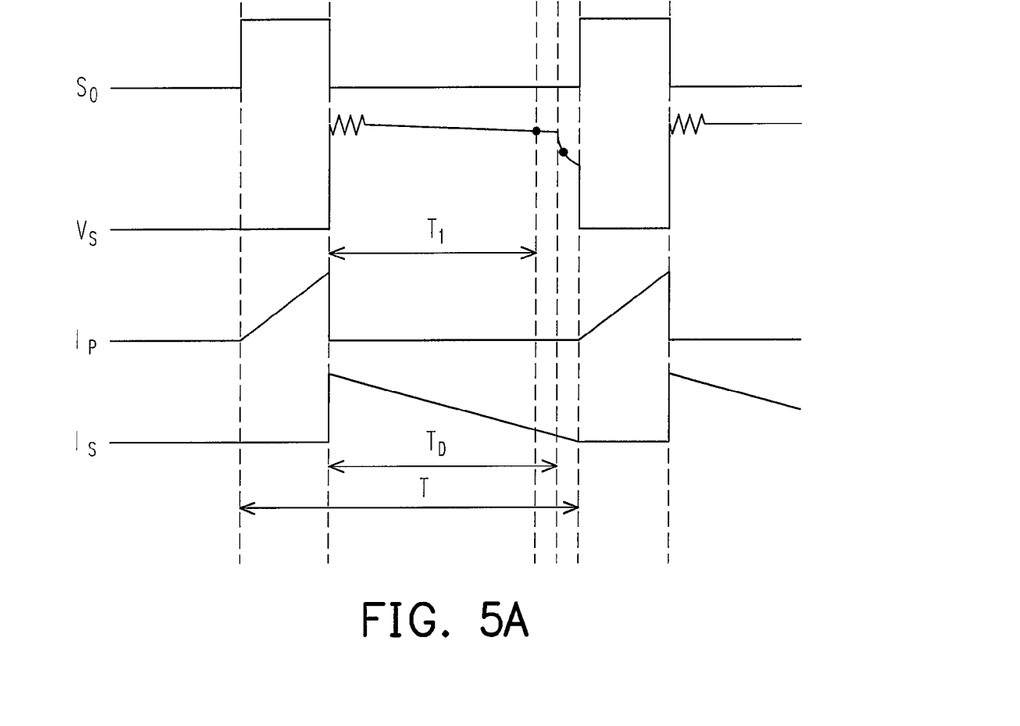
FIGS. 5A and 5B show waveforms for the power converter of the preferred embodiment of the present invention.
Figure 5B:
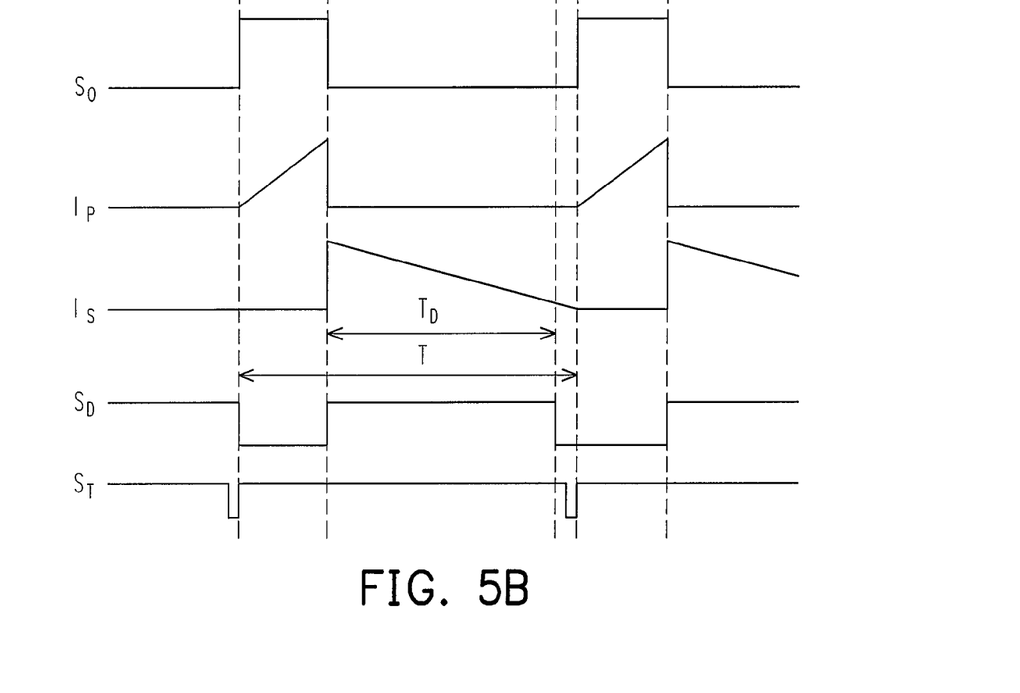

FIGS. 5A and 5B show waveforms of the signals as describe above. The current of the programmable current source 170 and the capacitance of the capacitor 172 determine the delay time $T_1$ for sampling the reflected voltage $V_{AUX}$ and generate the voltage signal. The period T is the pulse width of the period signal $S_T$ that is correlated to the period of the switching signal $S_O$. The period $T_D$ is the pulse width of the discharge-time signal $S_D$ that is correlated to the demagnetizing time of the transformer 10. The demagnetizing time of the transformer 10 is also equal to the duty cycle of the secondary-side switching current $I_S$ of the transformer 10. The voltage $V_S$ of the voltage-detection terminal VS is related to the reflected voltage $V_{AUX}$. FIG. 5A shows the voltage $V_S$ starts to decline once the transformer 10 is fully demagnetized. Therefore, the demagnetizing time of the transformer 10 can be obtained by detecting the reflected voltage $V_{AUX}$ of the transformer 10. The discharge-time signal $S_D$ is thus correlated to the duty cycle of the secondary-side switching current $I_S$ of the transformer 10.

Figure 6:
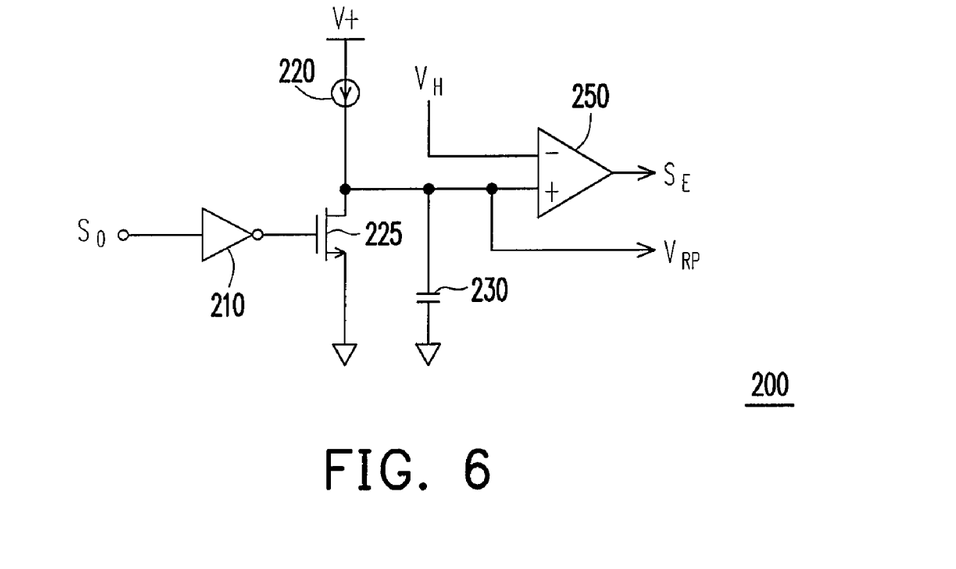
FIG. 6 shows a ramp signal generator.

FIG. 6 shows a preferred embodiment of the ramp signal generator 200, as shown in FIG. 2. The ramp signal generator 200 includes an inverter 210, a current source 220, a transistor 225, a capacitor 230 and a comparator 250. The switching signal $S_O$ is connected to the input of the inverter 210. The ramp signal $V_{RP}$ is generated in response to the enable of the switching signal $S_O$. The current of the current source 220 and the capacitance of the capacitor 230 determine the slope of the ramp signal $V_{RP}$. The ramp signal $V_{RP}$ is further connected to the input of the comparator 250. A reference voltage $V_H$ supplies another input of the comparator 250. The output of the comparator 250 generates the maximum on-time signal $S_E$ once the ramp signal $V_{RP}$ is higher than the reference voltage VH.

Figure 7:
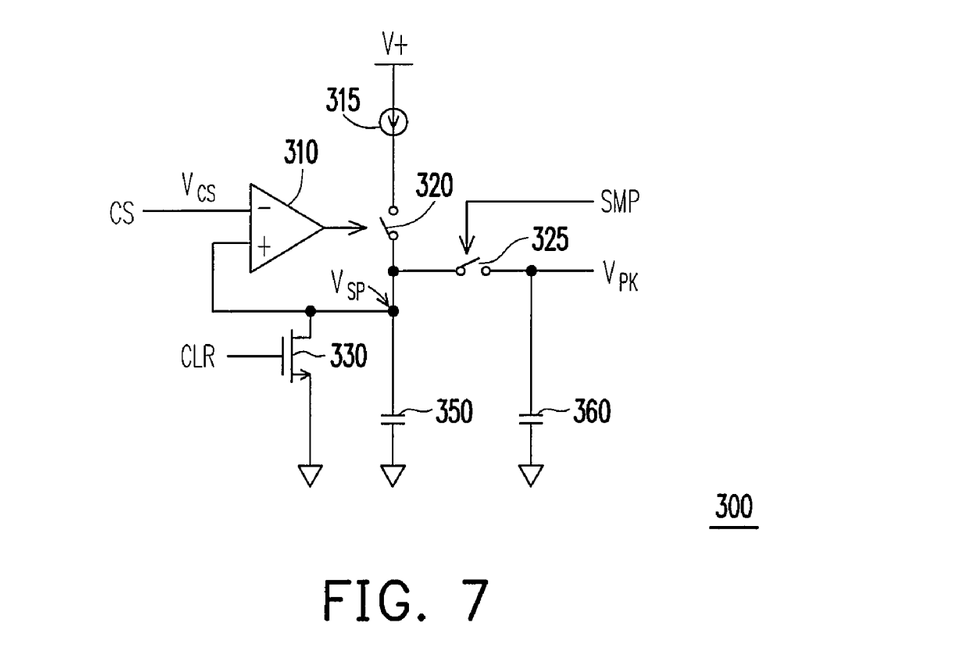
FIG. 7 illustrates a schematic diagram of a current-detection circuit according to an embodiment of the present invention.

FIG. 7 illustrates a schematic diagram of an embodiment of a current-detection circuit 300, as shown in FIG. 2. The current-detection circuit 300 includes a peak detector coupled to the current sense device 25 (FIG. 1) through the current-detection terminal CS to generate a peak current signal $V_{SP}$ in response to the peak value of the primary-side switching current $I_P$. A third sample circuit is connected to the peak detector to generate the primary-current signal $V_{PK}$ by sampling the peak current signal $V_{SP}$. A comparator 310, a current source 315, a switch 320, a transistor 330 and a capacitor 350 form the peak detector.

The comparator 310 has a positive input coupled to the current-detection terminal CS. The value of the primary-side current signal $V_{CS}$ is proportional to the value of the primary side switching current $I_P$. The capacitor 350 is used to hold the peak value of the primary-side current signal $V_{CS}$. The negative input of the comparator 310 is coupled to the capacitor 350. The constant current source 315 is applied to charge the capacitor 350. The switch 320 is coupled between the constant current source 315 and the capacitor 350. The switch 320 is turned on/off by the output of the comparator 310. The peak current signal $V_{SP}$ is thus generated across the capacitor 350. The peak current signal $V_{SP}$ is proportional to the current of $I_{P4}$. The transistor 330 is coupled in parallel with the capacitor 350 to discharge the capacitor 350 is response to clear-pulse signal CLR. A switch 325 and a capacitor 360 develop the third sample circuit. The switch 325 controlled by a sample-pulse signal SMP is used for sampling the peak current signal $V_{SP}$ from the capacitor 350 to the capacitor 360. The primary-current signal $V_{PK}$ is then obtained across the capacitor 360.

Figure 8:
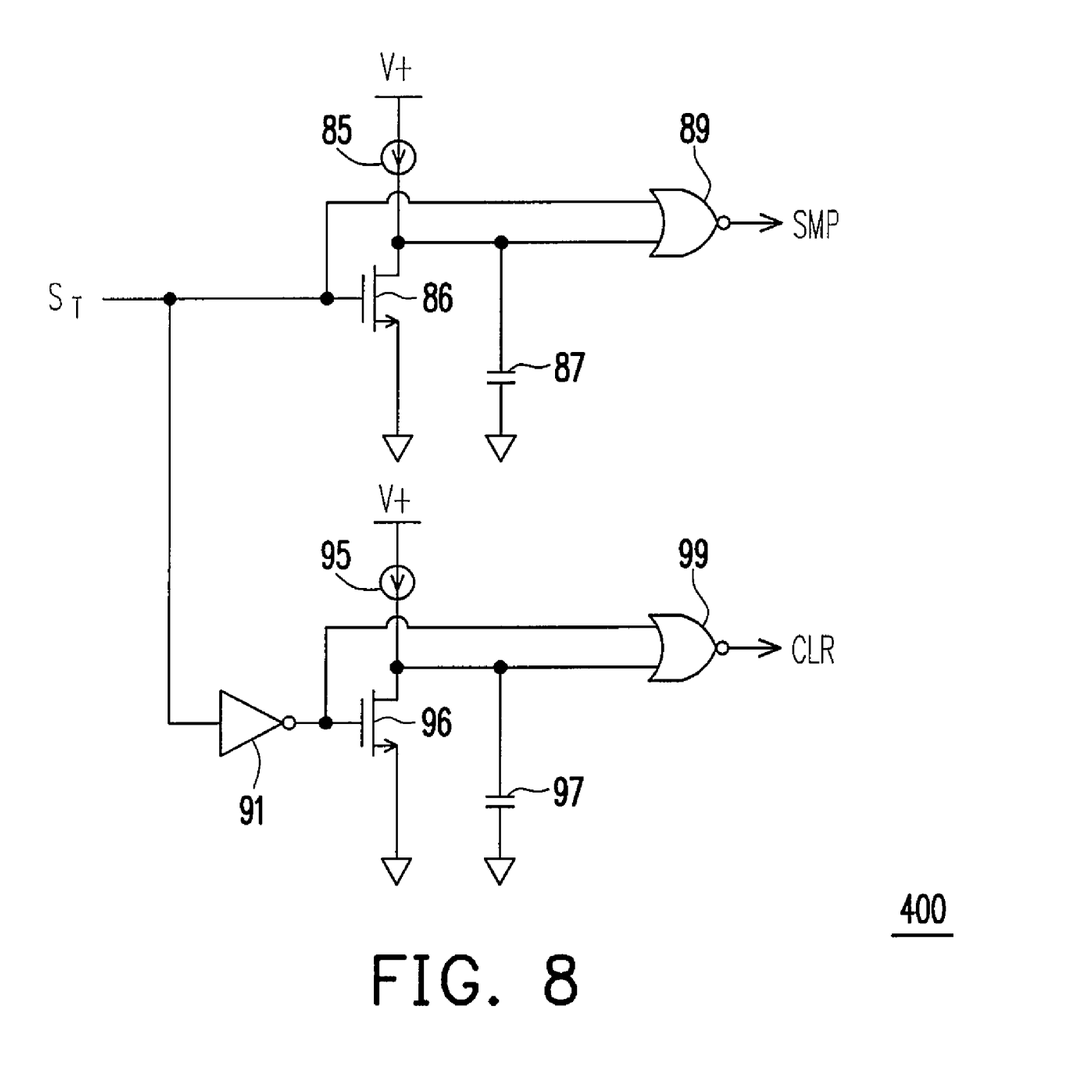
FIG. 8 illustrates a pulse generator.

FIG. 8 illustrates an embodiment of the pulse generator 400, as shown in FIG. 2. The pulse generator 400 includes a first pulse generator and a second pulse generator. The first pulse generator is used to generate the sample-pulse signal SMP in response to the falling edge of the period signal $S_T$. The second pulse is utilized to generate the clear-pulse signal CLR in response to the rising edge of the period signal $S_T$. The first pulse generator includes a current source 85, a transistor 86, a capacitor 87 and an NOR gate 89. The period signal $S_T$ is connected to the transistor 86 and the input of the NOR gate 89. The current source 85 is connected to the transistor 86 and the capacitor 87 to charge the capacitor 87 in response to the disable of the period signal $S_T$. The capacitor 87 is further connected to another input of the NOR gate 89. The output of the NOR gate 89 generates the sample-pulse signal SMP.

The second pulse generator includes an inverter 91, a current source 95, a transistor 96, a capacitor 97 and an NOR gate 99. Through the inverter 91, the period signal $S_T$ is connected to the transistor 96 and the input of the NOR gate 99. The current source 95 is connected to the transistor 96 and the capacitor 97 to charge the capacitor 97 in response to the enable of the period signal $S_T$. The capacitor 97 is further connected to another input of the NOR gate 99. The output of the NOR gate 99 generates the clear-pulse signal CLR.

Figure 9:
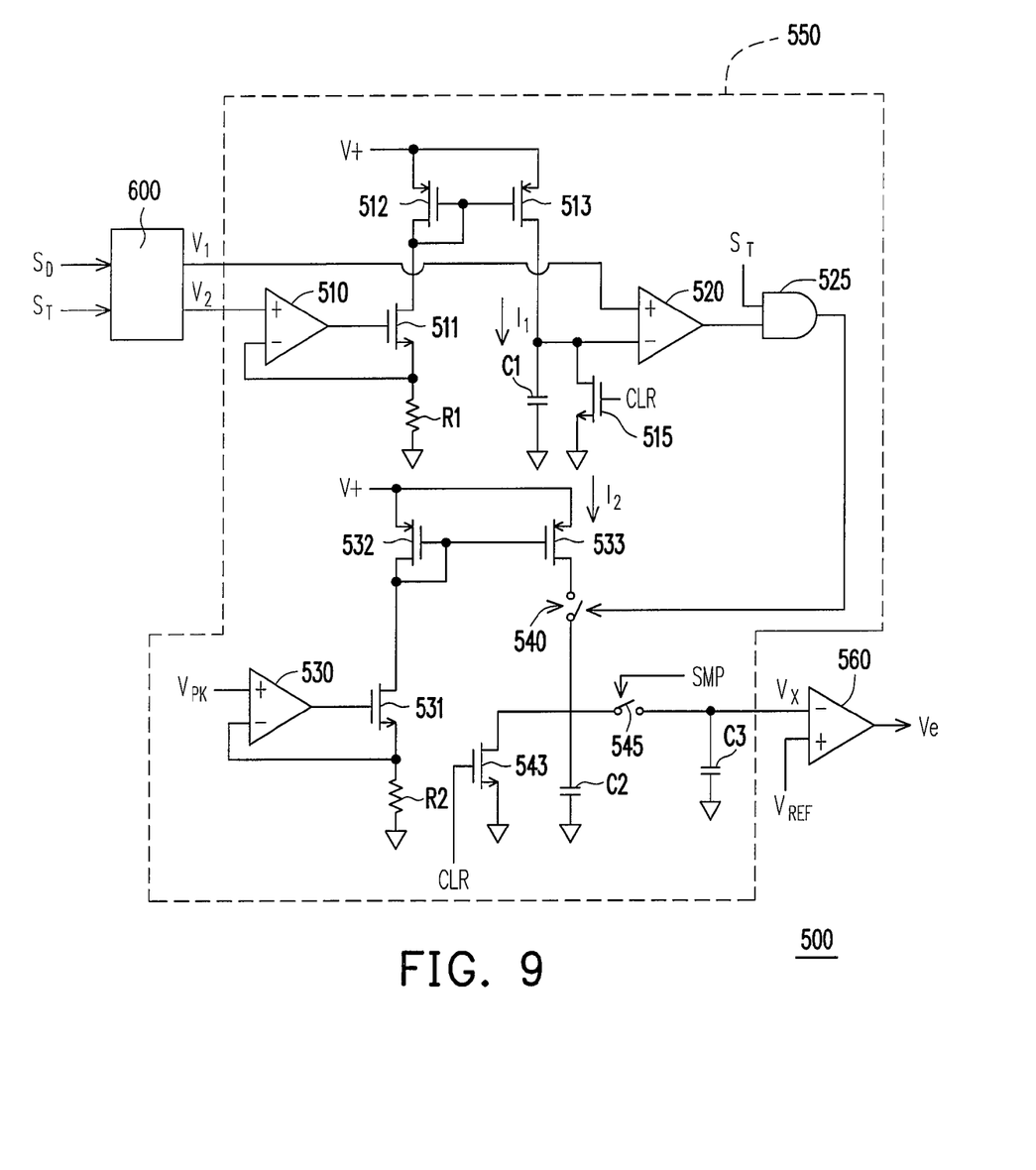
FIG. 9 illustrates a schematic diagram of a signal-process circuit according to an embodiment of the present invention.

FIG. 9 illustrates the signal-process circuit 500, as shown in FIG. 2, according to one embodiment of the present invention. A conversion circuit 600 is used for generating a first-voltage signal $V_1$ and a second-voltage signal $V_2$ in response to the discharge-time signal $S_D$ and the period signal $S_T$ respectively. An integration circuit 550 is used for generating the current signal $V_X$ in response to the first-voltage signal $V_1$, the second-voltage signal $V_2$ and the primary-current signal $V_{PK}$. The current signal $V_X$ is further coupled to an input of an error amplifier 560 to generate the current-error signal Ve. Another input of the error amplifier 560 is connected to a reference signal VREF.

Figure 10:
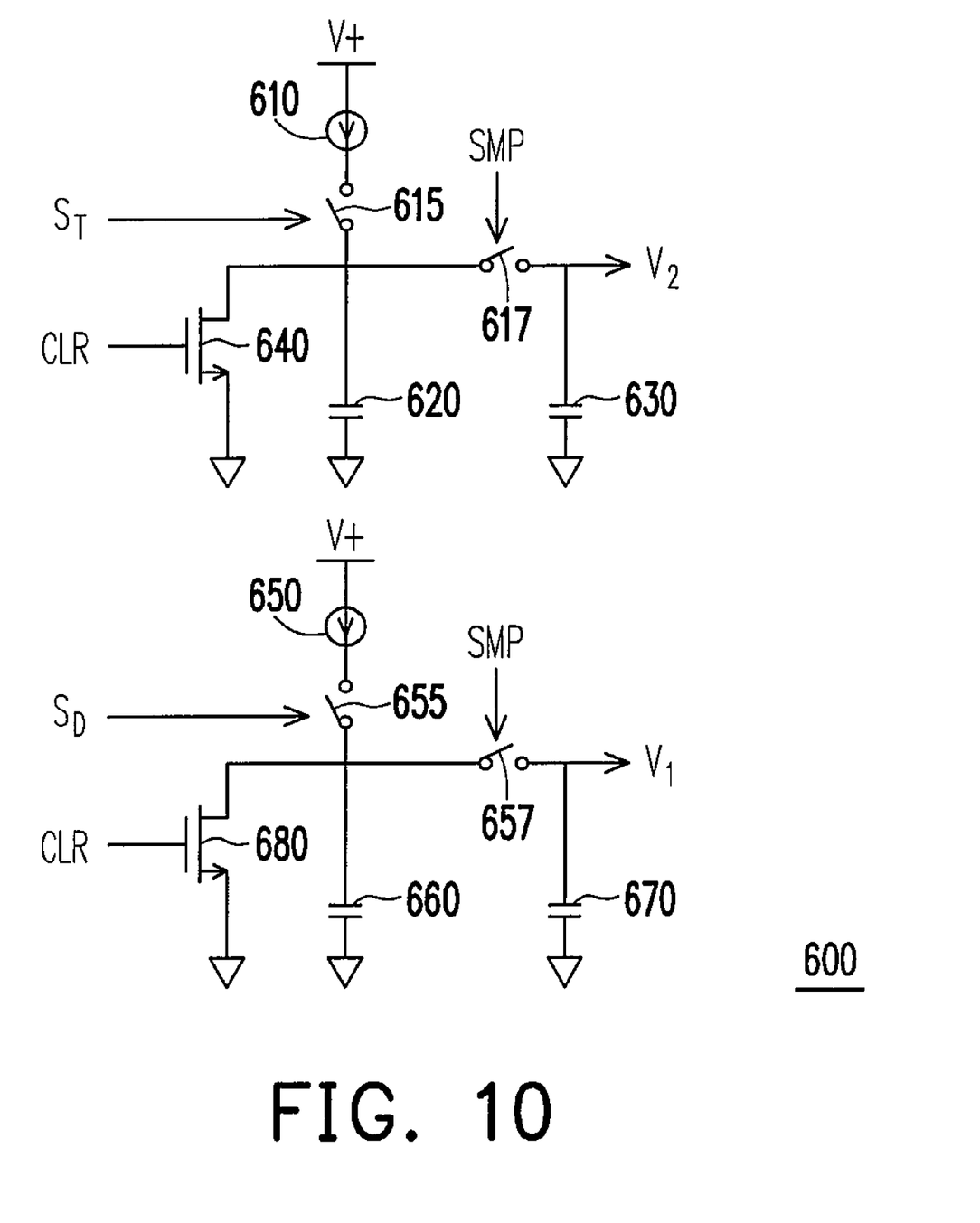
FIG. 10 illustrates a conversion circuit.

FIG. 10 shows an embodiment of the conversion circuit 600, as shown in FIG. 9. The conversion circuit 600 includes a first conversion circuit and a second conversion circuit. A current source 650, a transistor 680, capacitors 660, 670 and switches 655, 657 develop the first conversion circuit. The constant current 650 is coupled to charge the capacitor 660 through the switch 655. The switch 655 is controlled by the discharge-time signal $S_D$. The transistor 680 is parallel connected to the capacitor 660 to discharge the capacitor 660 in response to the clear-pulse signal CLR. The switch 657 controlled by the sample-pulse signal SMP is used to sample the voltage of the capacitor 660 to the capacitor 670. The first-voltage signal $V_1$ is thus generated at the capacitor 670 in accordance with the period of the discharge-time signal $S_D$. A current source 610, a transistor 640, capacitors 620, 630 and switches 615, 617 form the second conversion circuit. The constant current 610 is used to charge the capacitor 620 through the switch 615. The switch 615 is controlled by the period-time signal $S_T$. The transistor 640 is parallel connected to the capacitor 620 to discharge the capacitor 620 in response to the clear-pulse signal CLR. The switch 617 controlled by the sample-pulse signal SMP is utilized to sample the voltage of the capacitor 620 to the capacitor 630. Therefore, the second-voltage signal $V_2$ is generated at the capacitor 630 in accordance with the period of the period signal $S_T$.

$$V_1 = I_{650} \times \frac{T_D}{C_{660}} \quad (5)$$

$$V_2 = I_{610} \times \frac{T}{C_{620}} \quad (6)$$

where the $I_{650}$ is the current of the current source 650; $C_{660}$ is the capacitance of the capacitor 660; $T_D$ is the period of the discharge-time signal $S_D$; the $I_{610}$ is the current of the current source 610; $C_{620}$ is the capacitance of the capacitor 620; T is the period of the period signal $S_T$.

The integration circuit 550, as shown in FIG. 9, includes a first voltage-to-current circuit to generate a first current $I_1$ in response to the second-voltage signal $V_2$. An operational amplifier 510, a resistor R1, transistors 511, 512 and 513 develop the first voltage-to-current circuit. The second-voltage signal $V_2$ is coupled to the input of the operational amplifier 510 to generate a current $I_{511}$ at the transistor 511 in accordance with the second-voltage signal $V_2$ and the resistor R1. The current $I_{511}$ is further connected to a current mirror including mirror transistors 512 and 513 to generate the first-current $I_1$ at the transistor 513. A first capacitor C1 is coupled to the first current $I_1$ for charging the first capacitor C1. A transistor 515 is parallel connected to discharge the first capacitor C1 in response to the clear-pulse signal CLR. A comparator 520 having an input connected to the first capacitor C1. Another input of the comparator 520 is linked the first-voltage signal $V_1$. The output of the comparator 520 is coupled to an AND gate 525 to generate a charge signal CHG when the voltage of the first capacitor C1 is lower than the first-voltage signal $V_1$. Another input of the AND gate 525 is coupled to the period signal $S_T$. A second voltage-to-current circuit is used to generate a second-charge current $I_2$ in response to the primary-current signal $V_{PK}$. An operational amplifier 530, a resistor R2, transistors 531, 532 and 533 develop the second voltage-to-current circuit. The primary-current signal $V_{PK}$ is coupled to the input of the operational amplifier 530 to generate a current $I_{531}$ at the transistor 531 in accordance with the primary-current signal $V_{PK}$ and the resistor R2. The current $I_{531}$ is further connected to a current mirror including mirror transistors 532 and 533 to generate the second-current $I_2$ at the transistor 533. A second capacitor C2 is coupled to the second current $I_2$ through a switch 540 for charging the second capacitor C2. A transistor 543 is parallel connected to discharge the second capacitor C2 in response to the clear-pulse signal CLR. The switch 540 is controlled by the charge signal CHG. A switch 545 and a third capacitor C3 form a second sample circuit. The second sample circuit is coupled to the second capacitor C2 to generate the current signal $V_X$ at the third capacitor C3 by sampling the voltage of the second capacitor C2.

$$V_X = I_2 \times \frac{T_{CHG}}{C_2} = K_2 \times \frac{V_{PK}}{R_2} \times \frac{T_{CHG}}{C_2} \quad (7)$$

$$T_{CHG} = \frac{C_1 \times V_1}{I_1} = \frac{C_1 \times V_1}{K_1 \times \frac{V_2}{R_1}} \quad (8)$$

where $T_{CHG}$ is the period of the charge signal CHG; $C_1$ and $C_2$ are capacitance of capacitors C1 and C2; $R_1$ and $R_2$ are resistance of resistors R1 and R2; $K_1$ and $K_2$ are constants determined by transistors 512, 513 and transistors 532, 533. According to equation (7) and (8), the current signal $V_X$ can be rewritten as, $$V_X = \frac{K_2}{K_1} \times \frac{R_1}{R_2} \times \frac{C_1}{C_2} \times \frac{V_1}{V_2} \times V_{PK} \quad (9)$$

$$V_X = K_0 \times \frac{V_1}{V_2} \times V_{PK} \quad (10)$$

where $K_0$ is a constant determined by constants $K_1$, $K_2$, capacitances $C_1$, $C_2$ and resistances $R_1$, $R_2$.

Equation (10) shows the current signal $V_X$ is increased in response to the increase of first-voltage signal $V_1$ and the primary-current signal $V_{PK}$. The current signal $V_X$ is decreased in response to the increase of the second-voltage signal $V_2$.

Refer to equations (5) and (6), the equation (10) can be further rewritten as, $$V_X = K \times \frac{T_D}{T} \times V_{PK} \quad (11)$$

where K is a constant.

The current signal $V_X$ is increased in response to the increase of discharge-time signal $S_D$ and the primary-current signal $V_{PK}$. The current signal $V_X$ is decreased in response to the increase of the period signal $S_T$.

The output current $I_O$ of the power converter is the average of the secondary-side switching current $I_S$. The output current $I_O$ of the power converter can be expressed by, $$I_O = I_{SA} \times \frac{T_D}{2T} \quad (12)$$

The primary-side switching current $I_P$ is converted to primary-side current signal $V_{CS}$ by the current-sense device 25. The current-detection circuit 300 detects the primary-side current signal $V_{CS}$ and generates the primary-current signal $V_{PK}$. The current signal $V_X$ is designed by, $$V_X = \frac{V_{PK}}{2} \times \frac{T_D}{T} \quad (13)$$

It is corresponded to the equation (11). Furthermore, referring to the equation (4), the primary-current signal $V_{PK}$ can be shown as, $$V_{PK} = \frac{T_{NS}}{T_{NP}} \times R_S \times I_{SA} \quad (14)$$

where the $R_S$ is the resistance of the current-sense device 25.

According to equations (13), (14), the current signal $V_X$ can be expressed as, $$V_X = \frac{T_{NS}}{T_{NP}} \times R_S \times I_O \quad (15)$$

It is noted that the current signal $V_X$ is proportional to the output current $I_O$ of the power converter. The current signal $V_X$ increases whenever the output current $I_O$ increases.

Furthermore, the maximum value of the third signal $V_X$ is limited to the value of the reference signal $V_{REF}$ through the regulation of the error amplifier 560 and the current control loop. Under feedback control of the current control loop, a maximum output current $I_{O(MAX)}$ is given by, $$I_{O(MAX)} = \frac{T_{NP}}{T_{NS}} \times \frac{G_A \times G_{SW} \times V_{REF}}{1 + \left(G_A \times G_{SW} \times \frac{R_S}{K}\right)} \quad (16)$$

where $V_{REF}$ is the value of the reference voltage $V_{REF}$, $G_A$ is the gain of the error amplifier, and $G_{SW}$ is the gain of the switching circuit.

If the loop gain of the current control loop is high ($G_A \times G_{SW} \gg 1$), the maximum output current $I_{O(MAX)}$ could be given by, $$I_{O(MAX)} = K \times \frac{T_{NP}}{T_{NS}} \times \frac{V_{REF}}{R_S} \quad (17)$$

The maximum output current $I_{O(MAX)}$ of the power converter is thus regulated as a constant current in accordance with the reference signal $V_{REF}$. It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. An output current control circuit for a power converter, comprising:
   a current-detection circuit, coupled to a current sense device, for generating a primary-current signal in response to a primary-side switching current of a transformer;
   a voltage-detection circuit, coupled to the transformer, for generating a period signal and a discharge-time signal in response to a reflected voltage of the transformer;
   a signal-process circuits, for generating a current signal in response to the primary-current signal, the period signal and the discharge-time signal;
   a switching control circuit, coupled to the signal-process circuit, for generating a switching signal in response to the current signal; and
   a pulse generator, coupled to the voltage-detection circuit, for generating a sample-pulse signal in response to the period signal,
   wherein the switching signal is utilized to switch the transformer and regulate the output current of the power converter; the period signal is correlated to the switching period of the switching signal, the discharge-time signal is correlated to the duty cycle of a secondary-side switching current of the transformer; the current signal is correlated to the output current of the power converter; the sample-pulse signal is used to control sampling of the signal-process circuit.

2. The control circuit as claimed in claim 1, further comprising a ramp signal generator for generating a ramp signal in response to the switching signal.

3. The control circuit as claimed in claim 1, wherein the current-detection circuit comprising:
   a peak detector, coupled to the current sense device, for generating a peak current signal in response to the peak values of the primary-side switching current;
   a sample circuit, connected to the peak detector, for generating the primary-current signal by sampling the peak current signal.

4. The control circuit as claimed in claim 1, wherein the voltage-detection circuit comprising:
   a first sample circuit, coupled to the transformer, for generating a voltage signal by sampling the reflected voltage of the transformer;
   a first comparison circuit for generating a first reset signal in response to the reflected voltage of the transformer and the voltage signal; and
   a second comparison circuit for generating a second reset signal in response to the reflected voltage of the transformer and a threshold voltage,
   wherein the discharge-time signal is enabled in response to disable of the switching signal, the discharge-time signal is disabled in response to the first reset signal, the period signal is enabled in response to the enable of the switching signal, the period signal is disabled in response to the second reset signal.

5. The control circuit as claimed in claim 1, wherein the signal-process circuit comprising:
   a conversion circuit for generating a first-voltage signal and a second-voltage signal in response to the discharge-time signal and the period signal respectively; and
   an integration circuit for generating the current signal in response to the first-voltage signal, the second-voltage signal and the primary-current signal,
   wherein the current signal is increased in response to the increase of discharge-time signal and the primary-current signal; the current signal is decreased in response to the increase of the period signal.

6. The control circuit as claimed in claim 5, wherein the integration circuit comprising:
   a first voltage-to-current circuit for generating a first current in response to the second-voltage signal;

a first capacitor, coupled to the first current generated by the first voltage-to-current circuit, for charging the first capacitor;

a comparator having an input connected to the first capacitor; another input of the comparator is linked the first-voltage signal, wherein the comparator outputs a charge signal when the voltage of the first capacitor is lower than the first-voltage signal;

a second voltage-to-current circuit for generating a second-charge current in response to the primary-current signal;

a switch controlled by the charge signal;

a second capacitor, coupled to the second-charge current, for charging the second capacitor through the switch; and a second sample circuit, coupled to the second capacitor, for generating the current signal by sampling the voltage of the second capacitor, wherein the current signal is increased in response to the increase of first-voltage signal and the primary-current signal, and the current signal is decreased in response to the increase of the second-voltage signal.

7. An output current detection circuit for a power converter, comprising:

a current-detection circuit, for generate a primary-current signal in response to a switching current of a transformer;

a voltage-detection circuit, coupled to the transformer, for generating a period signal and a discharge-time signal;

a signal-process circuits for generating a current signal in response to the primary-current signal, the period signal and the discharge-time signal; and a pulse generator, coupled to the voltage-detection circuit, for generating a sample-pulse signal in response to the period signal, wherein the power converter includes a switching signal for switching the transformer and regulating the output of the power converter; the period signal is correlated to the switching period of the switching signal, the discharge-time signal is correlated to the demagnetizing period of the transformer, and the current signal is correlated to the output current of the power converter; the sample-pulse signal is used to control sampling of the signal-process circuit.

8. The detection circuit as claimed in claim 7, wherein the current-detection circuit comprising:

a peak detector, coupled to a current sense device, for generating a peak current signal in response to the peak value of the primary-side switching current; and a first sample circuit, connected to the peak detector, for generating the primary-current signal by sampling the peak current signal.

9. The detection circuit as claimed in claim 7, wherein the voltage-detection circuit comprising:

a first sample circuit, coupled to the transformer, for generating a voltage signal by sampling the reflected voltage of the transformer;

a first comparison circuit for generating a first reset signal in response to the reflected voltage of the transformer and the voltage signal; and a second comparison circuit for generating a second reset signal in response to the reflected voltage of the transformer and a threshold voltage, wherein the discharge-time signal is enabled in response to disable of the switching signal, the discharge-time signal is disabled in response to the first reset signal, the period signal is enabled in response to the enable of the switching signal, and the period signal is disabled in response to the second reset signal.

10. The detection circuit as claimed in claim 7, wherein the signal-process circuit comprising:

an integration circuit for generating the current signal in response to the discharge-time signal, the period signal and the primary-current signal, wherein the current signal is increased in response to the increase of discharge-time signal and the primary-current signal and the current signal is decreased in response to the increase of the period signal.

* * * * *